United States Patent [19]

Dhein et al.

[11] 4,146,519

[45] Mar. 27, 1979

[54] AIR-DRYING ACRYLATE LACQUER BINDERS

[75] Inventors: Rolf Dhein; Lothar Fleiter, both of Krefeld, Fed. Rep. of Germany

[73] Assignee: Bayer Aktiengesellschaft, Leverkusen, Fed. Rep. of Germany

[21] Appl. No.: 876,539

[22] Filed: Feb. 9, 1978

[30] Foreign Application Priority Data

Feb. 12, 1977 [DE] Fed. Rep. of Germany ....... 2706106

[51] Int. Cl.$^2$ .......................... C09D 3/74; C09D 3/80
[52] U.S. Cl. .............................. 260/23 AR; 260/23 P; 260/23 EP
[58] Field of Search ............ 260/22 EP, 23 EP, 23 P, 260/23 AR

[56] References Cited

FOREIGN PATENT DOCUMENTS

| | | | |
|---|---|---|---|
| 551429 | 1/1958 | Canada ................................ | 260/23 EP |
| 767476 | 2/1957 | United Kingdom ............... | 260/23 AR |
| 793776 | 4/1958 | United Kingdom ............... | 260/23 AR |
| 858827 | 1/1961 | United Kingdom ............... | 260/22 EP |
| 1227398 | 4/1971 | United Kingdom ............... | 260/23 AR |
| 1399159 | 6/1975 | United Kingdom ............... | 260/23 AR |

*Primary Examiner*—Ronald W. Griffin
*Attorney, Agent, or Firm*—Connolly and Hutz

[57] ABSTRACT

Air-drying lacquer binders comprising copolymers of copolymerised units of 20 to 55% by weight of styrene, 5 to 30% by weight of glycidyl (meth)acrylate, and 0 to 50% by weight of at least one (meth)acrylic acid ester having from 1 to 10 C-atoms in the alcohol component, which copolymers have been esterified to acid numbers of from 0 to 10 with from 22 to 50% by weight of air-drying fatty acids, based on the quantity of copolymer and drying fatty acids and dicarboxylic acid anhydride, and the hydroxyl groups thereby formed have subsequently been reacted with from 0.5 to 3% by weight of dicarboxylic acid anhydride, based on the quantity of copolymer and drying fatty acids and dicarboxylic acid anhydride, characterized in that the binders have acid numbers of from 5 to 15, these final acid numbers being made up of the acid numbers of from 0 to 10 obtained by the esterification with drying fatty acids and the acid numbers of from 1 to 15 obtained from the reaction with the dicarboxylic acid anhydride.

4 Claims, No Drawings

AIR-DRYING ACRYLATE LACQUER BINDERS

This invention relates to air-drying lacquer binders obtained from copolymers of styrene, (meth)acrylates and glycidyl (meth acrylates which are esterified to acid numbers of from 0 to 10 with from 22 to 50% of drying fatty acid mixtures after the copolymerisation process and are then reacted with dicarboxylic acid anhydrides (from 0.5 to 3%) until acid numbers of from 5 to 15 are reached. Such lacquer binders have excellent drying properties even after the addition of anti-skinning agents and their capacity to absorb and to wet pigments is excellent. Other advantages will appear from the description.

It is known that copolymers of styrene and glycidyl methacrylate can be reacted with drying fatty acids so that the carboxyl groups of the fatty acid are added to the epoxide groups of the copolymer, and then the resulting reaction products, which have acid numbers of about 1.2 to 5, based on the solid substance, can be used as air-drying lacquer binders (see British Pat. No. 767,476).

It is also known that copolymers of glycidyl (meth)acrylate and vinyl monomers or vinylidene monomers can be reacted with drying fatty acids and used as air-drying lacquer binders (with acid numbers of 10 to 15). Vinyl and vinylidene monomers are intended to mean vinyl toluene, (meth)acrylonitrile and (meth) acrylic acid esters (see British Pat. No. 793,776).

It is clear from German Offenlegungsschrift No. 2,247,146, page 2, paragraph 2, that the binders described in the above mentioned British Patent Specifications are completely inadequate in their capacity to absorb and wet pigments. They suffer from severe loss of gloss after drying and have not been industrially utilised to any significant extent.

According to German Offenlegungsschrift No. 1,720,697, in order to overcome the shortcomings of the binders according to British Pat. Nos. 767,476 and 793,776, copolymers are prepared from at least one vinyl monomer and at least one comonomer which contains epoxide groups, the copolymers are esterified with drying fatty acids to produce products with acid numbers of between about 12 and 16, based on the solid substance, and the hydroxyl groups formed in the esterification reaction are reacted with a dicarboxylic acid anhydride to from semiester groups, acid numbers of between about 20 and about 60, based on the quantity of binder, being necessary to produce a sufficiently pronounced effect. Binders which have been modified in this way have very good pigment absorption and wetting properties, presumably due to their high acid numbers, and they rapidly dry completely, have relatively constant drying times and good processing properties for lacquers, and give rise to films with high elasticity and hardness. Like many air-drying lacquers, however, the lacquers obtained from these binders have the undesirable characteristic of thickening and forming a skin when stored so that they require the addition of an anti-skinning agent. If anti-skinning agents such as the oximes or phenol compounds conventionally used for air-drying lacquers are added to the acrylate resin lacquers described above, the formation of a skin during storage of the lacquers is prevented or at least considerably delayed, but the drying time of the lacquers is also greatly increased, especially the time required for tack-free drying. This delay in drying, which prevents the practical application of these air-drying acrylate lacquers, is all the more pronounced the longer the lacquers are stored before use.

An object of the present invention is to modify the air-drying binders of German Offenlegungsschrift No. 1,720,697 so that in addition to their excellent pigment absorption and wetting capacity they would also have very satisfactory processing properties for lacquer technology, great hardness, high elasticity and high gloss in the dried films, as well as short drying times even after the addition of an anti-skinning agent.

The problem has been solved by selecting special copolymers according to German Offenlegungsschrift No. 1,720,697 which have been esterified with air-drying fatty acids up to acid numbers of from 0 to 10 and then reacted with a dicarboxylic acid anhydride, preferably tetrahydrophthalic acid anhydride or its isomers, to a total acid number of from 5 to 15. It is preferred to use the special copolymers selected from German Offenlegungsschrift No. 1,720,697. In principle, it is suitable to use copolymers of glycidyl (meth)acrylate with at least one vinyl monomer, particularly with the vinyl monomers indicated in German Offenlegungsschrift No. 1,720,697.

The binders according to the invention are distinguished not only by their very good processing properties for lacquer technology and by the good properties of the films obtained after drying but also by their very good pigment absorption and wetting properties, as well as the short drying times obtained even after the addition of an anti-skinning agent. This result is surprising since in view of the teaching according to German Offenlegungsschrift No. 1,720,697 it was not foreseeable that after reduction of the acid numbers from 20–60 to 5–15 it would be possible not only to obtain short drying times after the addition of an anti-skinning agent but also to preserve the very good pigment absorption and wetting characteristics of the binders.

The present invention thus provides air-drying lacquer binders of copolymers obtained from copolymerised units of 20 to 55% by weight of styrene,
5 to 30% by weight of glycidyl (meth)acrylate, and
0 to 50% by weight of at least one (meth)acrylic acid ester containing from 1 to 10 C-atoms in the alcohol component, which copolymers have been esterified to an acid number of from 0 to 10 with from 22 to 50% by weight of air-drying fatty acids, based on the copolymer and the drying fatty acids and dicarboxylic acid anhydride, and the hydroxyl groups formed in the reaction have subsequently been reacted with from 0.5 to 3% by weight of dicarboxylic acid anhydride, based on the quantity of copolymer and drying fatty acids and dicarboxylic acid anhydride, characterised in that the binders have final acid numbers of from 5 to 15, this final acid number being made up of the acid number of from 0 to 10 obtained by the esterification with the drying fatty acid and acid number of from 1–15 obtained from the reaction with the dicarboxylic acid anhydride.

The copolymers preferably consist of copolymerised units of

20–45% by weight of styrene,
10–25% by weight of glycidyl acrylate, glycidyl methacrylate or mixtures thereof, and
10–30% by weight of at least one ester of acrylic or methacrylic acid having from 1 to 4 C-atoms in the alcohol component.

The copolymers are preferably esterified up to an acid number of 0 to 10 with from 25–40% by weight of air-drying fatty acids.

Air-drying fatty acids are, for example, the fatty acids of linseed oil, soya bean oil, sunflower oil, cotton seed oil, groundnut oil, tall oil and safflower oil in their natural composition; that is to say, these natural air-drying fatty acids are mixtures of saturated, mono-unsaturated and/or poly-unsaturated fatty acids which have air-drying properties, the poly-unsaturated fatty acids mainly having isolated double bonds. For example, the fatty acids of the oils mentioned above have approximately the following compositions in percentages by weight:

|  |  | Linseed oil | Soya bean oil | Sunflower oil | Cotton seed oil | Ground-nut oil | Tall oil | Saf-flower oil |
|---|---|---|---|---|---|---|---|---|
| Myristic acid | ($C_{14}$) | 0.2 | — | — | 3.3 | 0.5 | — | 0.1 |
| Palmitic acid | ($C_{16}$) | 5.6 | 6.5 | 3.5 | 19.9 | 7.8 | 4.6 | 4.5 |
| Stearic acid | ($C_{18}$) | 3.5 | 4.5 | 2.9 | 1.3 | 3.1 | 4.6 | 2.0 |
| Arachidonic acid | ($C_{20}$) | 0.6 | 0.7 | 0.6 | 0.6 | 2.4 | — | 0.4 |
| Behenic acid | ($C_{22}$) | — | — | — | — | 3.1 | — | 0.4 |
| Lignoceric acid | ($C_{24}$) | 0.1 | — | 0.4 | — | 1.1 | — | — |
| Oleic acid | ($C_{18}$) | 21.0 | 33.5 | 34.1 | 29.6 | 56.0 | 30 | 20 |
| Linoleic acid | ($C_{18}$) | 24.0 | 52.5 | 58.5 | 45.3 | 26.0 | 24 | 70 |
| Linolenic acid | ($C_{18}$) | 45.0 | 2.3 | — | — | — | 8 | 3 |

The natural, drying fatty acids contain approximately 5–25% by weight of saturated $C_8$–$C_{24}$ fatty acids, 20–60% by weight of monoolefinically unsaturated $C_{18}$ fatty acids, in particular oleic acid, and 20–75% by weight of tri-unsaturated and/or diunsaturated $C_{18}$ fatty acids containing mainly isolated double bonds.

Instead of or in combination with the above mentioned natural, drying fatty acids having several double bonds there may also be used polyunsaturated fatty acids with conjugated double bonds obtained by isomerisation, for example fatty acid mixtures containing 9, 11-linoleic acid.

The copolymers to be used for the esterification with the drying fatty acids and for the semi-ester formation with the dicarboxylic acid anhydride are prepared by known polymerisation processes, for example the process described in German Offenlegungsschrift No. 1,720,697. They contain the built-in monomers mainly in statistical distribution and they have average molecular weights ($M_n$, number average) of approximately 2000 to 20,000, preferably from 3000 to 10,000, determined in xylene by the method of the lowering of the vapour pressure. Lower molecular weights impair the drying activity even in the presence of oximes and in particular also in the presence of anti-skinning agents.

For the new binder according to the invention it is advantageous to use a combination of certain molecular weights with certain acid numbers and possibly also a certain number of free acids containing groups which can be built into the molecule. The final acid numbers of the binder are from 5 to 15. The proportion of free acids should be characterised by the acid number of the first stage of the process, which is 0–10.

Hence follows a difference in the acid number of from 1–15 for the half-esterification with dicarboxylic acid anhydrides. If this acid number is applied to the polymeric semi-ester, it is found that the polymeric semi-esters contain from about 0.1 to about 2 COOH groups per molecule.

The dicarboxylic acid anhydrides which are added to the hydroxyl groups of the reaction products of glycidyl (meth)acrylate/polymer and drying fatty acids may be, for example, succinic acid anhydride, maleic acid anhydride, phthalic acid anhydride, tetrahydrophthalic anhydride and its isomers or mixtures of these tetrahydrophthalic acid anhydrides, hexahydrophthalic acid anhydride, methyl hexahydrophthalic acid anhydride and endomethylene tetrahydrophthalic acid anhydride. Tetrahydrophthalic acid anhydrides are preferably used.

Addition of the air-drying fatty acids to the copolymers which contain epoxide groups is carried out at temperatures of from 60° C. to 200° C., preferably at 100° C. to 170° C. and in organic solvents such as xylene or solvent naphtha, preferably without catalysts, and continued until the acid number, based on the solvent-free binder (= copolymer + dehydrating fatty acids) is from 0 to 10.

The drying fatty acids are used in quantities of from 22 to 50% by weight, based on the solid resin (copolymer + fatty acids + dicarboxylic acid anhydride), and are preferably used in quantities of from 25 to 40% by weight.

The addition of the dicarboxylic acid anhydrides, preferably tetrahydrophthalic acid anhydride or its isomers or mixtures of these anhydrides, to the hydroxyl groups of the resulting fatty acid-containing copolymers to form semi-esters is carried out at temperatures of about 50° C. to 180° C., preferably at 100° C. to 140° C. The dicarboxylic acid anhydride is put into this reaction in such quantities that the acid number, based on the binder after semi-ester formation, is from 5 to 15, preferably from 6 to 12. The quantity of dicarboxylic acid anhydride is from 0.5 to 3% by weight, always based on all the components of the binder (copolymer + fatty acids + dicarboxylic acid anhydride). Higher acid numbers severely retard drying in the presence of oximes.

The binders according to the invention are distinguished by excellent pigment absorption and wetting, little yellowing, rapid complete drying and good lacquer technical processing properties and the cured films obtained from them have a high gloss and good elasticity and hardness. Their main advantage compared with the known art (see German Offenlegungsschrift No. 1,720,697), which enables them to be industrially utilised, lies in the fact that the properties mentioned above are preserved even after the addition of an anti-skinning agent, in the fact that no delay in drying occurs at room temperature and no skin is formed during storage of the lacquers, and in the fact that the freshly dried lacquers have less thermoplasticity.

The binders according to the invention are dissolved in known manner in organic solvents such as xylene, aromatic solvent mixtures and ethylene glycol acetate, with or without the addition of mineral spirits, and they may be processed as clear lacquers, but are preferably pigmented with the usual pigments and mixed with the usual quantities of auxiliary agents such as levelling agents, siccatives and the like. The anti-skinning agents used may be aldoximes or ketoximes, for example butanone oxime, and they may be used in quantities of from 0.1 to 2.0% by weight, based on the solid binder.

The novel binders according to the invention may be used as the only binders of a lacquer system although they may, of course, also be combined with other resins for the modification of properties, as is customary in the chemistry of lacquers.

Another special advantage of the binders according to the invention is that in order to vary the properties of the films obtained, polyisocyanates or melamine resins may be added to the binders according to the invention. These added substances produce an additional cross-linking effect through any hydroxyl groups present and increase the hardness and resistance of the lacquers as well as rendering the fresh lacquer coats more rapidly ready for use.

The lacquer films may be obtained by the usual methods of application, such as brush coating, spraying, dipping or application with doctor wipers and the like on the usual substrates such as metals, wood, paper, glass, ceramics, stone, concrete, plastics, etc. They are generally dried at from 15° C.–30° C. although both higher and lower drying temperatures may be employed.

The percentage contents and parts given in the Examples are based on weight unless otherwise indicated. The acid number is defined as mg KOH/g substance.

COMPARISON EXPERIMENT 1

(Example 1 of German Offenlegungsschrift No. 1,720,697)

This Comparison Experiment demonstrates that white lacquers obtained from binders according to German Offenlegungsschrift No. 1,720,697 take considerably longer to dry to a tack-free state after the addition of the usual anti-skinning agents and gel prematurely or produce films of inferior quality, depending on the choice of the formulation, compared with white lacquers prepared from the binders according to the invention. White lacquers prepared from binders according to German Offenlegungsschrift No. 1,720,697 without the addition of an anti-skinning agent have no stability in storage.

According to Example 1 of German Offenlegungsschrift No. 1,720,697, a solution of 120 g of styrene, 78 g of methyl methacrylate and 102 g of glycidyl methacrylate in 500 g of xylene is heated to 80° C. under nitrogen for 25 hours after the addition of 2.8 g of azodiisobutyronitrile as catalyst and 0.8 g of dodecylmercaptan as a regulator. The conversion is said to be 100% and a clear, colourless polymer solution with an acid number of 1 and an outflow viscosity of 28 seconds from a DIN cup 4 at 20° C. is obtained. The molecular weight $M_n$ determined osmometrically in xylene is approximately 2000.

This solution is stirred for 8 hours under nitrogen at 140° C. after the addition of 194 g of a commercial linoleic acid which has an acid number of 200. The acid number of the solution obtained after this treatment is 5.

The clear, pale yellow reaction solution is then stirred with 25 g of phthalic acid anhydride under nitrogen at 140° C. for 75 minutes. A lacquer solution having a solids content of about 50% by weight and an acid number of 16, corresponding to an acid number of approximately 32 based on the solid binder, is thereby obtained.

Formulation A 65 g of titanium dioxide pigment (Rutile) and 1.25 g of calcium naphthenate (in the form of a solution in xylene with a metal content of 4% by weight), are added to 200 g of the polymer solution obtained. The resulting mixture is triturated twice in a three-roll mill. The paste thereby obtained is mixed with 20 g of xylene, 3 g of ethylene glycol, 2 g of butanone oxime, 2 g of silicone oil (5% in xylene), 1.7 g of cobalt naphthenate (in the form of a solution in xylene with a metal content of 6% by weight) and 2.1 g of lead naphthenate (used as a solution in xylene with a metal content of 24% by weight), and the mixture is diluted to a spraying viscosity with xylene/turpentine oil (proportions by volume 8:2).

The diluted lacquer solutions obtained in this way are cast on glass plates and dried at room temperature while the plates are held vertically. Drying was found to be delayed by more than 10 hours. Pigment wetting is assessed as very good.

Determination of the pigment wetting is carried out with pigmented polymer solutions (50% by weight of titanium dioxide pigment, based on the solid resin) which have been adjusted to an outflow viscosity of 20 seconds from a DIN cup 4 at 20° C. The diluted lacquer solutions are cast on glass plates and dried at room temperature with the plates and dried at room temperature with the plates held vertically. The homogeneity of the film is assessed after drying. An assessment of very good pigment wetting means complete homogeneity while very poor pigment wetting means flocculation of the film (inhomogeneity).

COMPARISON EXPERIMENT 2

This experiment is similar to Comparison Experiment 1 except that the copolymer used in the previous Experiment was repolymerised to obtain products of higher molecular weight in order to demonstrate that higher molecular weights alone do not improve the drying properties. The repolymerisation was carried out with heating at 110° C. until the product had an outflow viscosity of 104 seconds from a DIN cup 4 (DIN 53 211), as compared with the product in Comparison Experiment 1, in which the visocisty was only 28 seconds.

Esterification with fatty acid followed by semi-ester formation with phthalic acid anhydride was carried out as described in Comparison Experiment 1. The molecular weight $M_n$ determined osmometrically in xylene was approximately 3000.

The product obtained in Comparison Experiment 2 was used to produce a lacquer by the same method as described in Comparison Experiment 1, using formulation A. Without the addition of an anti-skinning agent, the lacquer gelled within a short time.

With the addition of an anti-skinning agent, the lacquer remained usable.

The freshly prepared lacquer dried to a tack-free state within a few hours. When the test was repeated after the lacquer had been left to stand for three days, the lacquer was found to have lost its drying activity. It was then not free from tackiness even after a drying time of 5 hours.

This Comparison Experiment clearly shows that the longer initial polymerisation time to produce more highly viscous compounds is not sufficient on its own to overcome the disadvantages of such systems.

EXAMPLE 1

This Example according to the invention demonstrates that a binder prepared from the same starting materials as those used in Comparison Experiment 1 and having the same composition but with the acid numbers defined according to the invention not only has excellent pigment wetting but also has a short drying time even after the addition of an anti-skinning agent.

According to Example 1 of German Offenlegungsschrift No. 1,720,697, 192 parts of styrene, 124.8 parts of methyl methacrylate and 163.2 parts of glycidyl methacrylate are dissolved in 800 parts of xylene and the solution is polymerised to a conversion of 100% after the addition of 4.48 parts of azodiisobutyric acid nitrile (ADBN) and 1.28 parts of dodecylmercaptan as a regulator.

Polymerisation is commenced at 80° C. and continued at 110° C. After three hours, a further 0.136 parts of ADBN are added. The temperature is then kept at 110° C. for 24 hours, and a further 0.136 parts of ADBN are added every 2 hours.

The colourless copolymer solution obtained has an outflow viscosity of 83 seconds (DIN 53 211), as compared with 28 seconds for Comparison Experiment 1.

1159.0 parts of the copolymer solution are esterified with 306.0 parts of commercial linoleic acid at 140° C. to an acid number of 6, based on the solid substance.

600.0 parts of the clear, pale yellow reaction solution are then converted to the semi-ester by reaction with 3.2 parts of phthalic acid anhydride at 120° C. in the course of 45 minutes. The solvent-free semi-ester has an acid number of 13. The viscosity of the reaction solution is 5925 cp (at 20° C.).

The molecular weight Mn of the semi-ester is approximately 3000, determined osmometrically in xylene.

A white lacquer is prepared from the pale yellow solution of the semi-ester, using lacquer formulation A.

The lacquer can be preserved with an anti-skinning agent. Freshly prepared lacquers have drying times of 2 hours. A lacquer which has been stored for three days is found to have preserved its drying activity and has a drying time of 2 hours. Pigment wetting is assessed as very good.

EXAMPLE 2

Lacquer formulation A mentioned above contains lead naphthenate as a siccative, among others. In the binders mentioned above, this siccative tends to cause turbidity in the lacquer solution. It is therefore in many cases advisable to prepare lead-free lacquers in accordance with the following lacquer formulation B:
170.0 parts of binder solution
65.0 parts of titanium dioxide rutile
64.0 parts of xylene
1.2 parts of zinc octoate solution (metal content 8%)
3.0 parts of ethylene glycol acetate
1.5 parts of anti-skinning agent (approximately 55% solution of butanone oxime in mineral spirits)
3.0 parts of silicone oil solution, 1% in xylene
1.0 parts of cobalt octoate solution (metal content 6%)
3.3 parts of zirconium solution (metal content 6%).

The samples obtained from Comparison Experiments 1 and 2 and Example 1 are now used to prepare lacquers according to Formulations A and B, and these lacquers are applied to glass plates and left to dry overnight.

If the freshly dried lacquers are heated to 60° C. the next morning, zirconium-containing lacquers obtained from the samples of the Comparison Experiment are found to have an unpleasant thermoplastic quality which can be assessed by touching the surface of the lacquer with a finger or the palm of the hand. Under this test, higher thermoplastic lacquers are found to stick.

Thermoplasticity at 60° C.

|  | Comparison Experiment 1 | Comparison Experiment 2 | Example 1 |
| --- | --- | --- | --- |
| Lacquer formulation A | tack free | tack free | tack free |
| Lacquer formulation B | severe sticking | severe sticking | tack free |

The low thermoplasticity of the freshly dried lacquers is another technical advantage which is particularly important for motor car body repair work since freshly lacquered cars are quite likely to be strongly heated by exposure to the sun.

We claim:
1. An air-drying lacquer binder consisting essentially of a copolymer of copolymerised units of
   20 to 55% by weight of styrene,
   5 to 30% by weight of glycidyl (meth)acrylate, and
   0 to 50% by weight of at least one (meth)acrylic acid ester having from 1 to 10 C-atoms in the alcohol component, which copolymer has been esterified to an acid number of from 0 to 10 with from 22 to 50% by weight of at least one drying fatty acid, based on the quantity of copolymer and drying fatty acid and dicarboxylic acid anhydride, and the hydroxyl groups thereby formed have subsequently been reacted with from 0.5 to 3% by weight of a dicarboxylic acid anhydride, based on the quantity of copolymer and drying fatty acid and dicarboxylic acid anhydride, the reaction product having an acid number of from 5 to 15, this final acid number being made up of the acid number of from 0 to 10 obtained by the esterification with the drying fatty acid and the acid number of from 1 to 15 obtained from the reaction with the dicarboxylic acid anhydride.

2. A lacquer binder as claimed in claim 1, wherein from 25 to 40% by weight of the drying fatty acid is used.

3. A lacquer binder as claimed in claim 1, wherein the copolymer comprises:
   20 to 45% by weight of styrene,
   10 to 25% by weight of glycidyl acrylate, glycidyl methacrylate or a mixture thereof, and 10 to 30% by weight of at least one ester of (meth)acrylic acid having from 1 to 4 C-atoms in the alcohol component.

4. A method of preparing an air-drying lacquer binder, consisting essentially of, esterifying a copolymer of copolymerised units of 20 to 55% by weight of styrene, 5 to 30% by weight of glycidyl (meth)acrylate, and 0 to 50% by weight of at least one (meth)acrylic acid ester having from 1 to 10 C-atoms in the alcohol component, to an acid number of from 0 to 10 with from 22 to 50% by weight of at least one drying fatty acid, based on the quantity of copolymer and drying fatty acids and dicarboxylic acid anhydride; and subsequently reacting the hydroxyl groups thereby formed with from 0.5 to 3% by weight of dicarboxylic acid anhydride, based on the quantity of copolymer and drying fatty acid and dicarboxylic acid anhydride, thereby forming a reaction product with an acid number of from 5 to 15, this final acid number being made up of the acid number of from 0 to 10 obtained by the esterification with drying fatty acid and the acid number of from 1 to 15 obtained from the reaction with the dicarboxylic acid anhydride.

\* \* \* \* \*